United States Patent
Gryaznov

(10) Patent No.: US 7,069,316 B1
(45) Date of Patent: Jun. 27, 2006

(54) AUTOMATED INTERNET RELAY CHAT MALWARE MONITORING AND INTERCEPTION

(75) Inventor: Dmitry Gryaznov, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 637 days.

(21) Appl. No.: 10/076,441

(22) Filed: Feb. 19, 2002

(51) Int. Cl.
*G06F 15/173* (2006.01)

(52) U.S. Cl. ..................................... 709/224

(58) Field of Classification Search ........ 709/217–219, 709/224, 229; 713/200–202; 717/104, 124
See application file for complete search history.

(56) References Cited

U.S. PATENT DOCUMENTS

| | | | | |
|---|---|---|---|---|
| 5,889,943 | A | * | 3/1999 | Ji et al. .................. 726/22 |
| 6,389,472 | B1 | * | 5/2002 | Hughes et al. ............ 709/229 |
| 6,611,925 | B1 | * | 8/2003 | Spear ..................... 714/38 |
| 2002/0178381 | A1 | * | 11/2002 | Lee et al. ................. 713/201 |
| 2003/0084326 | A1 | * | 5/2003 | Tarquini .................. 713/200 |
| 2004/0064515 | A1 | * | 4/2004 | Hockey ................... 709/206 |

OTHER PUBLICATIONS

The Gale Group, "GeCAD introduces Romainian Antivirus 6.50", GUI Program News, v9, n12, Dec. 1998.*
FitzGerald, "Virus Bulletin", ISSN 0956-9979, Oct. 1998.*
Free Online Dictionary of Computing; Aug. 22, 2001; http://web.archive.org/web/20010622192251/http://foldoc.doc.ic.ac.uk/foldoc/foldoc.cgi?bot.*
"Slennox's eggdrop page: what is an eggdrop?"; Jan. 16, 2000; http://web.archive.org/web/20000116043151/http://www.egghelp.org/whatis.htm.*
"Slennox's eggdrop page: what is an eggdrop?"; Jan. 17, 2001; http://web.archive.org/web/20010617224545/www.egghelp.org/commands/channels.shtml.*

* cited by examiner

*Primary Examiner*—David Wiley
*Assistant Examiner*—J. Bret Dennison
(74) *Attorney, Agent, or Firm*—Christopher J. Hamaty

(57) ABSTRACT

A method, system, and computer program product for providing monitoring and interception of malwares in Internet Relay Chat (IRC), which is secure, does not require significant system resources, and is capable of monitoring multiple IRC networks and servers. A method of detecting a computer malware comprises the steps of joining an Internet Relay Chat server, retrieving a list of channels of the Internet Relay Chat server, monitoring at least one channel in the list of retrieved channels, accepting data received from the monitored channel, and storing and logging the data received from the monitored channel.

21 Claims, 3 Drawing Sheets

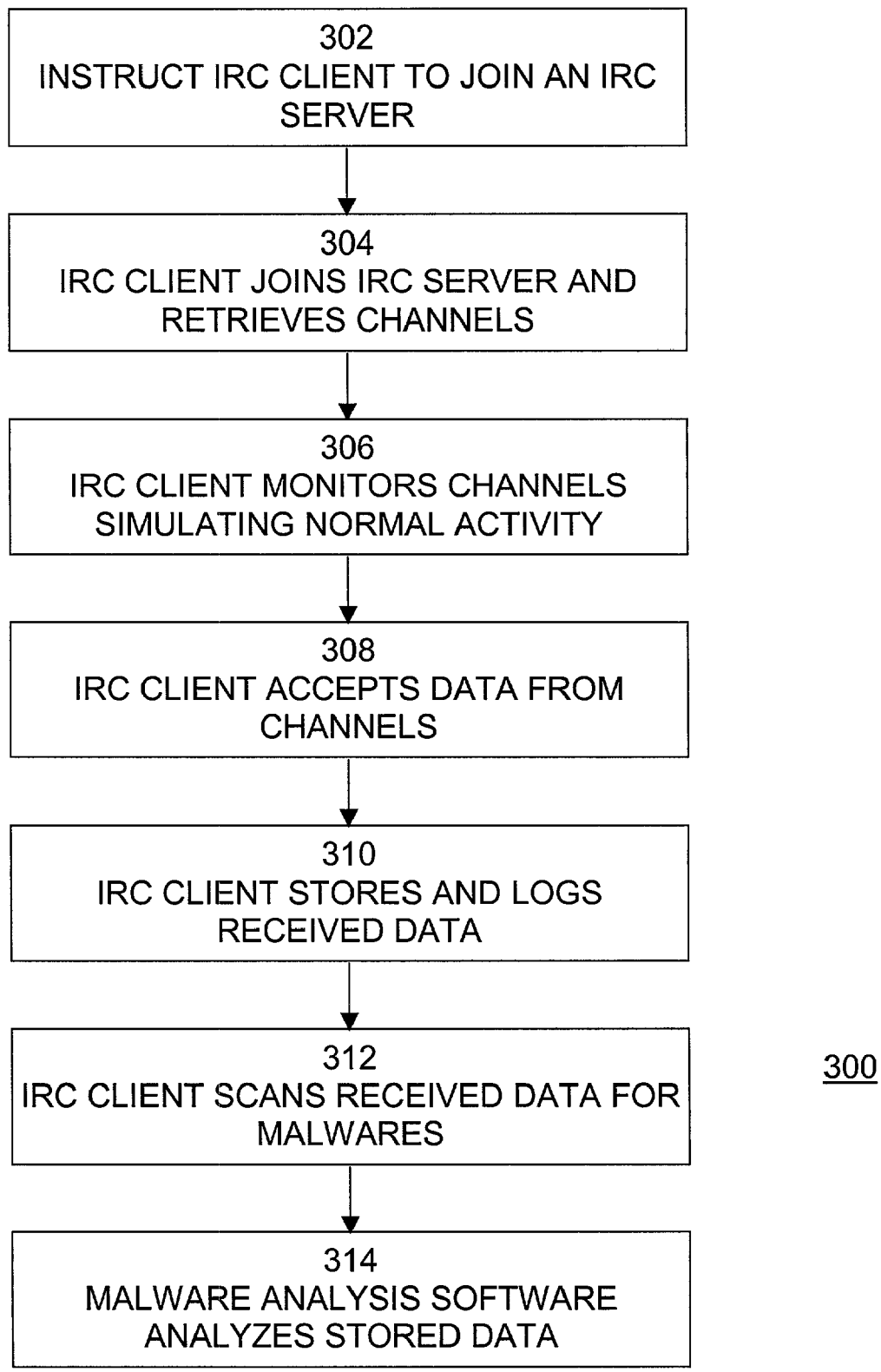

AUTOMATED INTERNET RELAY CHAT MALWARE MONITORING AND INTERCEPTION

FIELD OF THE INVENTION

The present invention relates to a method and system for automated monitoring and interception of malwares in Internet Relay Chat.

BACKGROUND OF THE INVENTION

As the popularity of the Internet has grown, the proliferation of computer malware has become more common. A typical computer malware is a program or piece of code that is loaded onto a computer and/or performs some undesired actions on a computer without the knowledge or consent of the computer operator. The most widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system and compares the data being scanned with profiles that identify various kinds of malware. The anti-virus program may then take corrective action, such as notifying a user or administrator of the computer system of the virus, isolating the file or data, deleting the file or data, etc.

The Internet has become a major medium for the spread of computer malwares, for example, using the Internet Relay Chat system. Internet Relay Chat (IRC) is a chat system that has become more popular as more people get connected to the Internet because it enables people connected anywhere on the Internet to join in live discussions. Unlike older chat systems, IRC is not limited to just two participants. To join an IRC discussion, an IRC client and Internet access are needed. The IRC client is a program that runs on a computer and sends and receives messages to and from an IRC server. The IRC server, in turn, is responsible for making sure that all messages are broadcast to everyone participating in a discussion. There can be many discussions going on at once; each one is assigned a unique channel.

Although IRC is relatively little known among the majority of computer users, there still are many thousands who do use it. IRC provides users with the capability of having on-line real-time conversations with other users world-wide. The IRC consists of "chatrooms"—called "IRC channels"—which IRC users can join. There are quite a few popular and unconnected IRC networks (e.g. Dalnet, Undernet, etc.), with multiple IRC servers on each network.

In addition to chat, IRC also allows sending files between users, which is the feature exploited by many viruses, trojans (including "backdoors"), Distributed Denial of Service (DDoS) "agents" (a.k.a. "zombies") and other malware. Some "IRC-aware" viruses, while being considered practically extinct in other areas, are still being spread via IRC (for example, "LoveLetter" and "Stages"). New viruses, trojans, etc. are often "distributed" via IRC first, or even only distributed via IRC, and thus make it into "the wild". Still, IRC is generally not being monitored by most anti-virus programs and thus new threats appearing in IRC are generally noticed too late in many cases.

There have been attempts at anti-virus monitoring IRC since the first "IRC-born" and "IRC-aware" viruses appeared back in mid-90s. All those implementations used and use the most popular IRC client programs—such as mIRC—with its rather powerful and insecure scripting mechanism. The problem is that the malwares use exactly the same popular clients and their insecure scripting languages to spread and/or to deliver the payload. Thus, monitoring IRC this way is not secure either. Another problem that arises is that such a client requires a lot of system resources. And yet another problem that arises is that it only one IRC network/server can be monitored at a time.

A need arises for a technique that will provide monitoring and interception of malwares in IRC, which is secure, does not require significant system resources, and is capable of monitoring multiple IRC networks and servers.

SUMMARY OF THE INVENTION

The present invention is a method, system, and computer program product for providing monitoring and interception of malwares in Internet Relay Chat (IRC), which is secure, does not require significant system resources, and is capable of monitoring multiple IRC networks and servers.

In one embodiment of the present invention, a method of detecting a computer malware comprises the steps of joining an Internet Relay Chat server, retrieving a list of channels of the Internet Relay Chat server, monitoring at least one channel in the list of retrieved channels, accepting data received from the monitored channel, and storing and logging the data received from the monitored channel.

In one aspect of the present invention, the monitoring step comprises the steps of joining a channel, waiting a time delay, and leaving the channel. The monitoring step may further comprise the step of simulating user activities. The simulating step may comprise the step of transmitting a message to the channel.

In one aspect of the present invention, the method further comprises the step of scanning the received data to detect a computer malware. The computer malware may comprise at least one of a computer virus, a computer worm, or a computer Trojan horse program.

In one aspect of the present invention, the method further comprises the step of analyzing the stored and logged data to detect a computer malware. The computer malware may comprise at least one of a computer virus, a computer worm, or a computer Trojan horse program. The method may further comprise the step of scanning the received data to detect a computer malware. The computer malware may comprise at least one of a computer virus, a computer worm, or a computer Trojan horse program.

In one aspect of the present invention, the monitoring step comprises the steps of joining a channel, waiting a time delay, and leaving the channel. The monitoring step may further comprise the step of simulating user activities. The simulating step may comprise the step of transmitting a message to the channel. The computer malware may comprise at least one of a computer virus, a computer worm, or a computer Trojan horse program.

In one embodiment of the present invention, a system for detecting computer malwares comprises a processor operable to execute computer program instructions, a memory accessible by the processor, the memory comprising at least one Internet Relay Chat client operable to detect a computer malware in an Internet Relay Chat channel and storage operable to store data received by the Internet Relay Chat client.

In one aspect of the present invention, the Internet Relay Chat client is operable to detect a computer malware by performing the steps of joining an Internet Relay Chat server, retrieving a list of channels of the Internet Relay Chat server, monitoring at least one channel in the list of retrieved channels, accepting data received from the monitored channel, and storing and logging the data received from the monitored channel in the storage. The monitoring step may comprise the steps of joining a channel, waiting a time delay, and leaving the channel. The monitoring step may further comprise the step of simulating user activities. The simulating step comprises the step of transmitting a message to the channel.

In one aspect of the present invention, the Internet Relay Chat client is further operable to scan the received data to detect a computer malware. The computer malware may comprise at least one of a computer virus, a computer worm, or a computer Trojan horse program.

In one aspect of the present invention, the system further comprises malware analysis software operable to analyze the stored and logged data to detect a computer malware. The computer malware may comprise at least one of a computer virus, a computer worm, or a computer Trojan horse program. The Internet Relay Chat client may be further operable to scan the received data to detect a computer malware. The computer malware may comprise at least one of a computer virus, a computer worm, or a computer Trojan horse program. The monitoring step may comprise the steps of joining a channel, waiting a time delay, and leaving the channel. The monitoring step may further comprise the step of simulating user activities. The simulating step may comprise the step of transmitting a message to the channel. The computer malware may comprise at least one of a computer virus, a computer worm, or a computer Trojan horse program.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary flow diagram of a process of operation of the present invention.

DETAILED DESCRIPTION OF THE INVENTION

A typical computer malware is a program or piece of code that is loaded onto a computer and/or performs some undesired actions on a computer without the knowledge or consent of the computer operator. Types of malware include computer viruses, Trojan horse programs, and other content. One widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers. A particular type of computer virus is the computer worm, which is a program or code that replicates itself over a computer network and may performs malicious actions, such as using up the computer's resources and possibly shutting the system down. An Internet worm is a computer worm that is spread over the Internet. Internet worms can infect very large number of computer systems worldwide within a relatively short time. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer.

In describing the present invention, the term virus is used for clarity. However, the term virus is used only as an example of malware and the present invention contemplates any and all types of malware.

Figure 1:
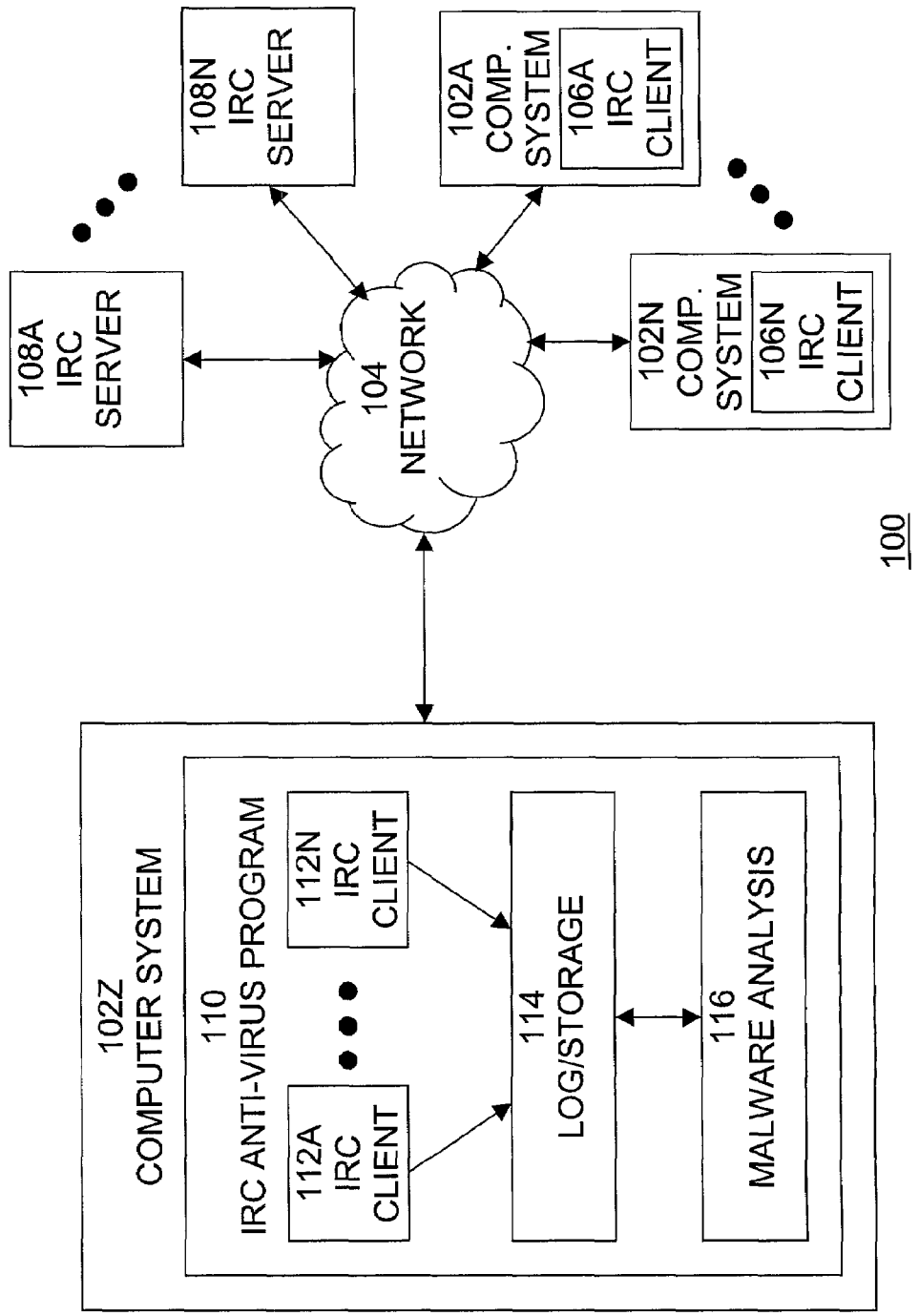
FIG. 1 is an exemplary block diagram of a typical system incorporating the present invention.

An exemplary block diagram of a typical system 100 incorporating the Internet Relay Chat (IRC) monitoring and interception of the present invention is shown in FIG. 1. System 100 includes one or more computer systems, such as computer systems 102A–N, which are communicatively connected to a data communications network 104, such as a public data communications network, for example, the Internet, or a private data communications network, for example, a private intranet. Computer systems 102A–N are capable of generating and transmitting requests for information over network 104 to other computer systems, as well as receiving and responding to requests for information over network 104 from other computer systems. Among the other computer systems with which computer systems 102A–N may communicate are other computer systems, servers, etc., which may be connected to network 104. Where network 104 is an intranet, computer systems such as customer workstations and proprietary servers are typically communicatively connected to network 104. Where network 104 is the Internet, computer systems such as Web servers, Internet service provider servers, and customer personal computer systems and workstations are typically communicatively connected to network 104.

One type of communication that may be performed by computer system 102A–N is Internet Relay Chat (IRC). IRC is a chat system that enables people connected anywhere on the Internet to join in live discussions. IRC is not limited to just two participants. In order to implement IRC, a computer system needs an IRC client and Internet access. For example, computer system 102A includes IRC client 106A and computer system 102N includes IRC client 106N. The IRC client, such as IRC client 106A, is a program that runs on a computer system and sends and receives messages to and from an IRC server.

IRC servers, such as IRC servers 108A–N, are also communicatively connected to network 104. An IRC server, such as IRC server 106A, is responsible for making sure that all messages are broadcast to everyone participating in a discussion. There can be many discussions going on at once; each one is assigned a unique channel. IRC provides users with the capability of having on-line real-time conversations with other users world-wide. The IRC consists of "chatrooms"—called "IRC channels"—which IRC users can join. There are quite a few popular and unconnected IRC networks (e.g. Dalnet, Undernet, etc.), with multiple IRC servers on each network.

Also included in system 100 is computer system 102Z. Typically, computer system 102Z is a programmed general-purpose computer system, such as a personal computer, workstation, or server computer system. Computer system 102Z includes IRC anti-virus program 110, which monitors the IRC channels and detects malwares present in the data streams transmitted in those IRC channels.

Typically, "IRC-aware" malwares use unsolicited so-called DCC Send requests to transmit themselves to a different computer on IRC. Most often those requests are "triggered" whenever an unsuspecting user joins a "channel", although some are triggered when a user "leaves" a channel or sends anything to a channel (in the way of conversation). In order to detect these malwares, IRC anti-virus program 110 includes one or more specialized IRC clients 112A–N. IRC clients 112A–N operate with a very restricted and secure scripting language support. Several IRC clients 112A–N can be run on computer system 102Z simultaneously and fully automatically, in the background. Each IRC client, such as IRC client 112A, is instructed, by the means of the restricted but secure scripting language, to join a particular IRC server, retrieve the list of channels on that server, and then monitor the channels. Monitoring the channels involves, "joining" and "leaving" each channel with a suitable time delay, and simulating "normal" user activities. For example, IRC client 112A may send simple messages to the channels, etc., so as to trigger possible malwares in that channel into sending themselves or other malware to the IRC client 112A. Each IRC client 112A–N automatically accepts all such DCC Send requests and stores everything received safely and securely in log/storage container 114. Each IRC client 112A–N also logs, in log/storage container 114, what data was received, along with when and from where the data was received. Each IRC client 112A–N can further scan the received files for known viruses, collect the statistics, notify the administrator of anything new undetected yet, etc. Malware analysis software 116 may perform automated analysis of the data stored in log/storage container 114. Alternatively, all or a portion of the contents of log/storage container 114 may be analyzed by other computer systems or manually.

Malware analysis software 116 may analyze the contents of log/storage container 114 using one or more anti-virus scanners to detect and identify known malwares that are included in the contents of log/storage container 114. These techniques are merely examples, as the present invention contemplates any technique for malware recognition and analysis.

Figure 2:
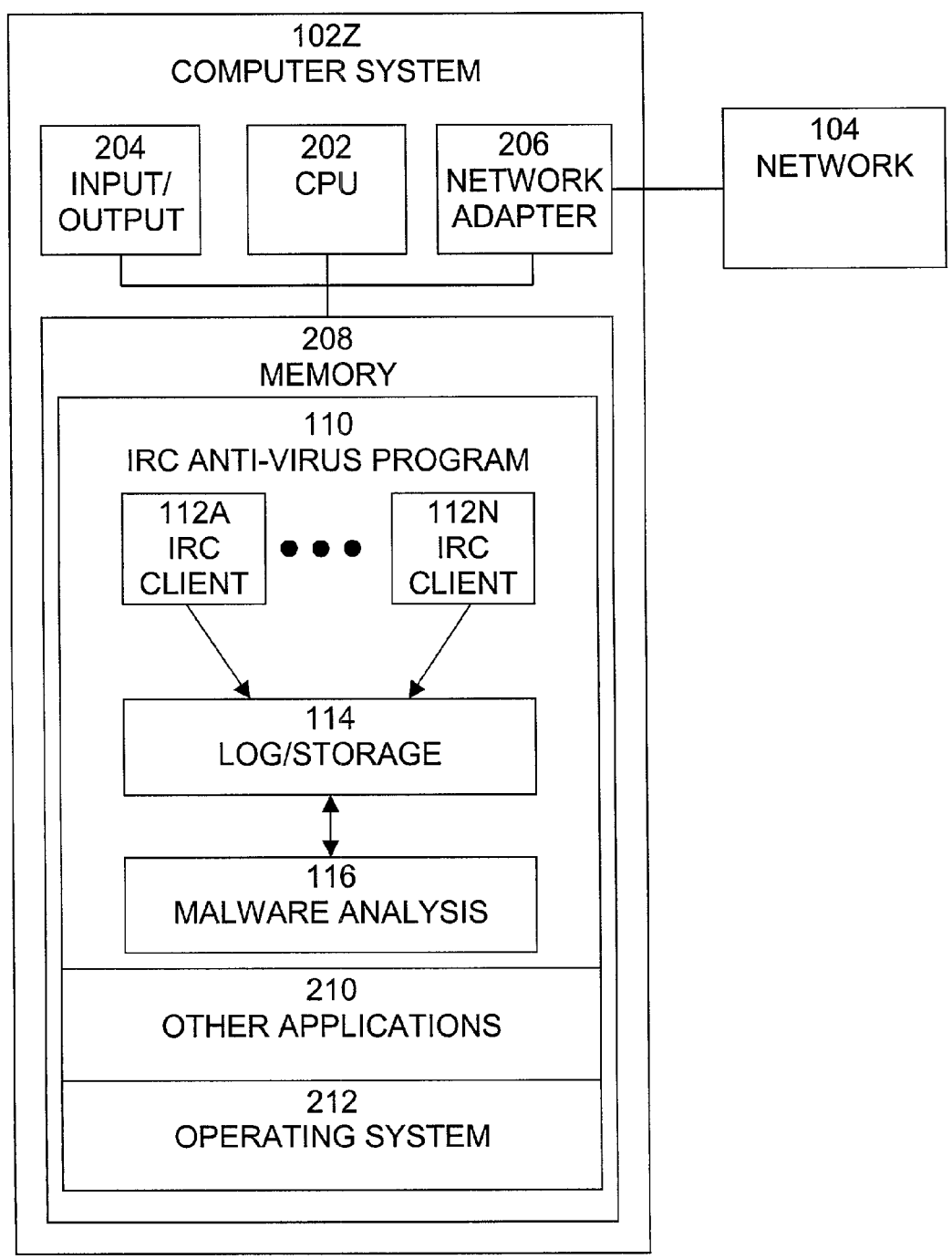
FIG. 2 is a block diagram of an exemplary computer system, in which the present invention may be implemented.

A block diagram of an exemplary computer system 102Z, shown in FIG. 1, is shown in FIG. 2. Computer system 102Z is typically a programmed general-purpose computer system, such as a personal computer, workstation, server system, and minicomputer or mainframe computer. Computer system 102Z includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Although in the example shown in FIG. 2, computer system 102Z is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 102Z is implemented on a plurality of networked computer systems, which may be single-processor computer systems, multi-processor computer systems, or a mix thereof.

Input/output circuitry 204 provides the capability to input data to, or output data from, computer system 102Z. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces computer system 102Z with network 104. Network 104 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes IRC anti-virus program 110, other applications 210, and operating system 212. IRC anti-virus program 110 includes one or more specialized IRC clients 112A–N, log/storage container 114, and malware analysis software 116. IRC clients 112A–N operate with a very restricted and secure scripting language support. Several IRC clients 112A–N can be run on computer system 102Z simultaneously and fully automatically, in the background. Each IRC client, such as IRC client 112A, is instructed, by the means of the restricted but secure scripting language, to join a particular IRC server, retrieve the list of channels on that server, and then monitor the channels. Monitoring the channels involves "joining" and "leaving" each channel with a suitable time delay, and simulating "normal" user activities. For example, IRC client 112A may send simple messages to the channels, etc., so as to trigger possible malwares in that channel into sending themselves or other malware to the IRC client 112A. Each IRC client 112A–N automatically accepts all such DCC Send requests and stores everything received safely and securely in log/storage container 114. Each IRC client 112A–N also logs, in log/storage container 114, what data was received, along with when and from where the data was received. Each IRC client 112A–N can further scan the received files for known viruses, collect the statistics, notify the administrator of anything new undetected yet, etc. Malware analysis software 116 may perform automated analysis of the data stored in log/storage container 114. Alternatively, all or a portion of the contents of log/storage container 114 may be analyzed by other computer systems or manually.

Malware analysis software 116 may analyze the contents of log/storage container 114 using one or more anti-virus scanners to detect and identify known malwares that are included in the contents of log/storage container 114. These techniques are merely examples, as the present invention contemplates any technique for malware recognition and analysis.

Other applications 210 are other application programs that may be run on computer system 102Z. IRC clients 112A–N consume relatively few system resources of computer system 102Z. This provides the capability to run other application programs, such as other applications 210, to perform other useful computing tasks on computer system 102Z, along with running IRC clients 112A–N. Operating system 212 provides overall system functionality.

An exemplary flow diagram of a process 300 of operation of the automated Internet Relay Chat malware monitoring and interception system of the present invention is shown in FIG. 3. It is best viewed in conjunction with FIG. 1. IRC anti-virus program 110 includes one or more specialized IRC clients 112A–N, log/storage container 114, and malware analysis software 116. IRC clients 112A–N operate with a very restricted and secure scripting language support. Several IRC clients 112A–N can be run on computer system 102Z simultaneously and fully automatically, in the background.

Process 300 begins with step 302, in which each IRC client, such as IRC client 112A, is instructed, by the means of the restricted but secure scripting language, to join a particular IRC server. In step 304, in accordance with the instructions, IRC client 112A joins the IRC server and retrieves the list of channels on that server. In step 306, IRC client 112A then monitors the channels in the retrieved list of channels on the IRC server. Monitoring the channels involves "joining" and "leaving" each channel with a suitable time delay, and simulating "normal" user activities. For example, IRC client 112A may send simple messages to the channels, etc., so as to trigger possible malwares in that channel into sending themselves or other malware to the IRC client 112A.

In step 308, IRC client 112A automatically accepts all received data from the monitored IRC channels, such as DCC Send requests. In step 310, IRC client 112A stores all received data safely and securely in log/storage container 114. IRC client 112A also logs, in log/storage container 114, what data was received, along with when and from where the data was received. In step 312, IRC client 112A scans the received data for known viruses, collects statistics, notifies the administrator of anything new undetected yet, etc. In step 314, malware analysis software 116 may perform automated analysis of the data stored in log/storage container 114. Alternatively, all or a portion of the contents of log/storage container 114 may be analyzed by other computer systems or manually.

Malware analysis software 116 may analyze the contents of log/storage container 114 using one or more anti-virus scanners to detect and identify known malwares that are included in the contents of log/storage container 114. These techniques are merely examples, as the present invention contemplates any technique for malware recognition and analysis.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of detecting a computer malware comprising the steps of:
    joining an Internet Relay Chat server;
    retrieving a list of channels of the Internet Relay Chat server;
    monitoring at least one channel in the list of retrieved channels, by:
        joining a channel,
        waiting a time delay,
        leaving the channel, and
        simulating user activities by transmitting a message to the channel;
    accepting data received from the monitored channel;
    storing and logging the data received from the monitored channel; and
    scanning the received data to detect a computer malware;
    wherein an Internet Relay Chat client is utilized in the joining, the retrieving, and the monitoring;
    wherein the Internet Relay Chat client scans the received data to detect the computer malware and collects statistics including a receipt time of the data and a sender of the data.

2. The method of claim 1, wherein the computer malware comprises at least one of a computer virus, a computer worm, or a computer Trojan horse program.

3. The method of claim 1, further comprising the step of:
    analyzing the stored and logged data to detect the computer malware.

4. The method of claim 3, wherein the computer malware comprises at least one of a computer virus, a computer worm, or a computer Trojan horse program.

5. A system for detecting a computer malware comprising:
    a processor operable to execute computer program instructions;
    a memory operable to store computer program instructions executable by the processor; and
    computer program instructions stored in the memory and executable to perform the steps of:
    joining an Internet Relay Chat server;
    retrieving a list of channels of the Internet Relay Chat server;
    monitoring at least one channel in the list of retrieved channels, by:
        joining a channel,
        waiting a time delay,
        leaving the channel, and
        simulating user activities by transmitting a message to the channel,
    accepting data received from the monitored channel;
    storing and logging the data received from the monitored channel; and
    scanning the received data to detect a computer malware;
    wherein an Internet Relay Chat client is utilized in the joining, the retrieving, and the monitoring;
    wherein the Internet Relay Chat client scans the received data to detect the computer malware and collects statistics including a receipt time of the data and a sender of the data.

6. The system of claim 5, wherein the computer malware comprises at least one of a computer virus, a computer worm, or a computer Trojan horse program.

7. The system of claim 5, further comprising the step of:
analyzing the stored and logged data to detect the computer malware.

8. The system of claim 7, wherein the computer malware comprises at least one of a computer virus, a computer worm, or a computer Trojan horse program.

9. A computer program product embodied on a computer readable medium for detecting a computer malware comprising:
computer program instructions, recorded on the computer readable medium, executable by a processor, for performing the steps of:
joining an Internet Relay Chat server;
retrieving a list of channels of the Internet Relay Chat server;
monitoring at least one channel in the list of retrieved channels, by:
joining a channel,
waiting a time delay,
leaving the channel, and
simulating user activities by transmitting a message to the channel;
accepting data received from the monitored channel;
storing and logging the data received from the monitored channel; and
scanning the received data to detect a computer malware;
wherein an Internet Relay Chat client is utilized in the joining, the retrieving, and the monitoring;
wherein the Internet Relay Chat client scans the received data to detect the computer malware and collects statistics including a receipt time of the data and a sender of the data.

10. The computer program product of claim 9, wherein the computer malware comprises at least one of a computer virus, a computer worm, or a computer Trojan horse program.

11. The computer program product of claim 9, further comprising the step of:
analyzing the stored and logged data to detect the computer malware.

12. The computer program product of claim 11, wherein the computer malware comprises at least one of a computer virus, a computer worm, or a computer Trojan horse program.

13. The method of claim 1, wherein transmitting the message to the channel is utilized for triggering the computer malware in the channel to be sent.

14. The method of claim 1, wherein the storing and logging includes storing and logging the receipt time of the data and the sender of the data.

15. The method of claim 1, wherein the Internet Relay Chat client automatically accepts and stores the data received from the monitored channel.

16. The method of claim 1, wherein the Internet Relay Chat client notifies an administrator of the computer malware.

17. The method of claim 1, wherein the received data includes direct client-to-client DCC send requests.

18. The method of claim 3, wherein the analyzing is automatically performed.

19. The method of claim 3, wherein the analyzing is performed manually.

20. The method of claim 1, wherein the monitoring is performed utilizing a restricted and secure scripting language.

21. The method of claim 1, wherein a plurality of Internet Relay Chat clients running on a single computer are each utilized in the joining, the retrieving, and the monitoring.

* * * * *